(12) United States Patent
Gordon et al.

(10) Patent No.: US 7,727,595 B2
(45) Date of Patent: Jun. 1, 2010

(54) COATING COMPOSITIONS CONTAINING A CARBINOL FUNCTIONAL SILICONE RESIN OR AN ANHYDRIDE FUNCTIONAL SILICONE RESIN

(75) Inventors: Glenn Viaplana Gordon, Midland, MI (US); John Bernard Horstman, Midland, MI (US); Randall Gene Schmidt, Midland, MI (US); Gary Michael Wieber, Midland, MI (US); Arthur James Tselepis, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 352 days.

(21) Appl. No.: 11/665,574

(22) PCT Filed: Oct. 20, 2005

(86) PCT No.: PCT/US2005/037964

§ 371 (c)(1),
(2), (4) Date: Apr. 16, 2007

(87) PCT Pub. No.: WO2006/047319

PCT Pub. Date: May 4, 2006

(65) Prior Publication Data

US 2009/0047441 A1    Feb. 19, 2009

Related U.S. Application Data

(60) Provisional application No. 60/621,740, filed on Oct. 25, 2004.

(51) Int. Cl.
B05D 3/02    (2006.01)
(52) U.S. Cl. .............. 427/385.5; 427/386; 427/387
(58) Field of Classification Search .......... None
See application file for complete search history.

(56) References Cited

U.S. PATENT DOCUMENTS

| 3,419,593 A |  | 12/1968 | Willing |
| 3,715,334 A |  | 2/1973 | Karstedt |
| 3,814,730 A |  | 6/1974 | Karstedt |
| 3,839,280 A |  | 10/1974 | Zdaniewski |
| 3,923,705 A |  | 12/1975 | Smith |
| 4,125,510 A |  | 11/1978 | Antonen |
| 4,157,357 A |  | 6/1979 | Mine et al. |
| 4,202,807 A |  | 5/1980 | Moretto et al. |
| 4,234,697 A |  | 11/1980 | Homan et al. |
| 4,426,431 A | * | 1/1984 | Harasta et al. ............ 430/14 |
| 4,632,859 A | * | 12/1986 | Wolfrey et al. ............ 442/104 |
| 4,657,986 A |  | 4/1987 | Isayama et al. |
| 4,722,951 A |  | 2/1988 | Yoshioka et al. |
| 4,795,680 A |  | 1/1989 | Rich et al. |
| 4,877,822 A |  | 10/1989 | Itoh et al. |
| 4,977,199 A |  | 12/1990 | Koleske et al. |
| 5,013,577 A |  | 5/1991 | Wright et al. |
| 5,015,700 A |  | 5/1991 | Herzig et al. |
| 5,102,960 A |  | 4/1992 | Imai et al. |
| 5,117,001 A |  | 5/1992 | Okinoshima et al. |
| 5,126,126 A |  | 6/1992 | Varaprath et al. |
| 5,135,993 A |  | 8/1992 | Decker et al. |
| 5,152,984 A |  | 10/1992 | Varaprath et al. |
| 5,175,325 A |  | 12/1992 | Brown et al. |
| 5,262,507 A |  | 11/1993 | Decker et al. |
| 5,283,279 A |  | 2/1994 | Hara et al. |
| 5,290,882 A |  | 3/1994 | Shiobara et al. |
| 5,290,901 A |  | 3/1994 | Burns et al. |
| 5,362,821 A |  | 11/1994 | Decker et al. |
| 5,378,532 A |  | 1/1995 | Decker et al. |
| 5,405,688 A |  | 4/1995 | Decker et al. |
| 5,431,765 A |  | 7/1995 | Decker et al. |
| 5,516,858 A |  | 5/1996 | Morita et al. |
| 5,814,679 A |  | 9/1998 | Eckberg et al. |
| 5,840,806 A |  | 11/1998 | Komazaki et al. |
| 5,891,969 A |  | 4/1999 | Mine et al. |
| 5,939,491 A |  | 8/1999 | Wilt et al. |
| 5,952,439 A |  | 9/1999 | Morita et al. |
| 6,040,394 A |  | 3/2000 | Wilt et al. |
| 6,046,276 A |  | 4/2000 | Ambrose et al. |
| 6,046,296 A |  | 4/2000 | Wilt et al. |
| 6,048,934 A |  | 4/2000 | Wilt et al. |
| 6,071,990 A |  | 6/2000 | Yip et al. |
| 6,103,824 A |  | 8/2000 | Wilt et al. |
| 6,103,838 A |  | 8/2000 | Wilt et al. |
| 6,136,928 A |  | 10/2000 | Wilt et al. |
| 6,187,863 B1 |  | 2/2001 | Wilt et al. |
| 6,475,628 B2 |  | 11/2002 | Hase et al. |

(Continued)

FOREIGN PATENT DOCUMENTS

| DE | 3803088 | 8/1988 |
| EP | 415204 | 3/1991 |
| GB | 1299575 | 12/1972 |
| GB | 1470058 | 4/1977 |
| JP | 03079624 | 4/1991 |
| JP | 05339279 | 12/1993 |
| JP | 06157551 | 6/1994 |

Primary Examiner—Erma Cameron
(74) Attorney, Agent, or Firm—Patricia M. Scaduto

(57) ABSTRACT

A radiation or thermal curable coating composition contains a cycloaliphatic epoxy resin, a carbinol functional silicone resin or an anhydride functional silicone resin, and a thermal or photoactivated acid catalyst. An organic polyol may also be included in the composition as an optional component. The composition is useful as a radiation curable coating, as an adhesive, a photodefinable coating, or as a thermal cure coating. The cycloaliphatic epoxy resin adds toughness and adhesion to the composition, whereas either of the carbinol functional silicone resin or the anhydride functional silicone resin provides the composition with water resistance, weatherability, thermal stability, and flexibility.

18 Claims, No Drawings

U.S. PATENT DOCUMENTS

| | | |
|---|---|---|
| 6,506,869 B2 | 1/2003 | Yamaguchi et al. |
| 6,565,969 B1 * | 5/2003 | Lamon et al. ............... 428/349 |
| 6,579,914 B1 | 6/2003 | Gantt et al. |
| 6,646,102 B2 | 11/2003 | Boriack et al. |
| 6,800,373 B2 | 10/2004 | Gorczyca |
| 2003/0221770 A1 * | 12/2003 | Meixner et al. ............. 156/230 |
| 2005/0113479 A1 * | 5/2005 | Eckberg ..................... 522/109 |
| 2008/0071017 A1 * | 3/2008 | Gordon et al. .............. 524/437 |
| 2008/0105375 A1 * | 5/2008 | Gordon et al. .............. 156/321 |

* cited by examiner

COATING COMPOSITIONS CONTAINING A CARBINOL FUNCTIONAL SILICONE RESIN OR AN ANHYDRIDE FUNCTIONAL SILICONE RESIN

CROSS-REFERENCE TO RELATED APPLICATIONS

This application is a U.S. national stage filing under 35 U.S.C. §371 of PCT Application No. PCT/US2005/037964 filed on 20Oct. 2005, currently pending, which claims the benefit of U.S. Provisional Patent Application No. 60/621,740 filed 25Oct. 2005under 35 U.S.C. §119 (e). PCT Application No. PCT/US2005/037964 and U.S. Provisional Patent Application No. 60/621,740 are hereby incorporated by reference.

DESCRIPTION

This invention relates to radiation or thermal curable coating compositions containing a cycloaliphatic epoxide resin, a carbinol functional silicone resin or an anhydride functional silicone resin, and a thermal or photoactivated acid catalyst. The compositions are useful as radiation curable coatings, adhesives, encapsulants, photodefinable coatings, and thermal cure coatings and adhesives. The cycloaliphatic epoxide resin adds toughness and adhesion to the composition, whereas the carbinol and anhydride functional silicone resins impart to the composition water resistance, weatherability, thermal stability, and flexibility.

Epoxy silicones in combination with carbinol functional silicone resins are known in the art. For example, U.S. Pat. No. 5,814,679 (Sep. 29, 1998) discloses blends of photocurable compositions containing epoxy functionalized silicones and long chain non-resinous silicones containing carbinol functionality. The '679 patent indicates that the long chain non-resinous carbinol containing silicones copolymerize or cocure with the epoxy functionalized silicones thereby permitting the formulation of premium release photo-curable silicone compositions.

Some types of silicone resins in combination with epoxy resins are known in the art. For example, U.S. Pat. No. 5,135,993 (Aug. 4, 1992) describes a blend of (A) a curable epoxy resin, and (B) an amino functional silicone resin containing units such as (i) $PhSiO_{3/2}$, (ii) $R_2SiO$, and (iii) an aminofunctional siloxy unit such as (a) $H_2NR'SiO_{3/2}$, (b) $R^{iv}HNR^{ii}SiO_{3/2}$, (c) $(R^{iv}HNR^{ii})_{3-y}(R^v)_ySiO_{1/2}$, and (d) $(H_2NR^{ii})_{3-x}(R^v)_xSiO_{1/2}$.

In contrast, this invention relates to a coating composition in one embodiment containing: (a) 20-300 parts by weight of a cycloaliphatic epoxide resin that is free of silicon atoms; and (b) 100 parts by weight of a carbinol functional silicone resin containing the units:

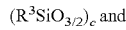 and

In the formulae, $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms. $R^3$ is an alkyl group having 1-8 carbon atoms or an aryl group, a has a value of less than or equal to 0.6, b has a value of zero or greater than zero, c has a value of greater than zero, d has a value of less than 0.5, and the value of a+b+c+d=1. When each $R^2$ is methyl, the value of b is less than 0.3.

There is on average at least one carbinol group per carbinol functional silicone resin molecule. Preferably, the $R^1+R^2+R^3$ groups in the carbinol functional silicone resin component (b) contain a high enough content of phenyl to provide the appropriate compatibility of component (b) with component (a). Preferably, greater than 10 percent by weight of the $R^1+R^2+R^3$ groups are phenyl groups, more preferably, greater than 25 percent by weight. Radiation curable coating compositions containing the cycloaliphatic epoxide resin, and the carbinol functional silicone resin, also contain (c) 0.01-10 parts by weight, preferably 0.1-5 parts by weigh based on the parts by weight of component(b), of a thermal or photoactivated acid catalyst, and optionally may contain (d) 0-300 parts by weight based on the parts by weight of component (b) of an organic polyol, preferably 1-300 parts by weight and more preferably 1-50 parts by eight on the same basis This invention also relates to a coating composition in a second embodiment containing: (a) 20-300 parts by weight of a cycloaliphatic epoxide resin that is free of silicon atoms; and (b) 50 parts by weight of an anhydride functional silicone resin containing units of the formulae:

 (i)

 (ii)

 (iii)

 (iv)

In the formulae (i)-(iv), $R^4$, $R^5$, and $R^6$ can each independently represent an anhydride group, a hydrogen atom, an alkyl group having 1-8 carbon atoms, an aryl group, an aralkyl group, or an alkaryl group. The value of e is 0.1-0.6. The value of f is zero to 0.5. The value of g is 0.3-0.8. The value of h is zero to 0.3. Preferably, e is 0.2-0.4, f is zero to 0.2, g is 0.5-0.8, and g is zero. The sum of e, f, g, and h, is one. The composition of an average resin molecule contains more than two anhydride groups. Preferably, the equivalent weight of the anhydride groups per anhydride functional silicone resin is 100-1000 and more preferably 200-800. Radiation curable coating compositions containing the cycloaliphatic epoxide resin and the anhydride functional silicone resin, also contain (c) 0.01-10 parts by weight based on component (b), preferably 0.1-5 parts by weight, of a thermal or photoactivated acid catalyst, and (d) 0-300 parts by weight based on the parts by weight of component (b) of an organic polyol, preferably 0-50 parts on the same basis.

The Cycloaliphatic Epoxide Resin

Component (a), the cycloaliphatic epoxide resins used herein are resins that are free of silicon atoms. Such resins are known compositions, and are shown, for example, in U.S. Pat. No. 4,977,199 (Dec. 11, 1990). In Columns 6-12 of the '199 patent, numerous resinous compositions are described in detail. The '199 patent is incorporated herein by reference.

Representative of cycloaliphatic epoxide resins include compounds prepared by epoxidation of multi-cycloalkenyls, i.e., polycyclic aliphatic compounds containing carbon-carbon double bonds, with organic peracids such as peracetic acid or hydrogen peroxide. These cycloaliphatic epoxide resins may be blended with minor amounts of glycidyl type epoxides, aliphatic epoxides, epoxy cresol novolak resins, epoxy phenol novolak resins, polynuclear phenol-glycidyl ether-derived resins, aromatic and heterocyclic glycidyl amine resins, hydantoin epoxy resins, and epoxides of natural oils such as soybean and linseed oil.

The cycloaliphatic epoxide resins that are used in this invention are those resins having an average of two or more epoxy groups per molecule. Illustrative of such cycloaliphatic epoxide resins are (i) diepoxides of cycloaliphatic esters of dicarboxylic acids such as bis(3,4-epoxycyclohexylmethyl) oxalate, bis(3,4-epoxycyclohexylmethyl) adipate, bis(3,4-epoxy-6-methylcyclohexylmethyl) adipate, and bis(3,4-epoxycyclohexylmethyl) pimelate; (ii) 3,4-epoxycyclohexylmethyl-3,4-epoxycyclohexane carboxylates such as 3,4-epoxycyclohexylmethyl-3,4-epoxycyclohexane carboxylate, 3,4-epoxy-1-methylcyclohexylmethyl-3,4-epoxy-1-methycyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, and 3,4-epoxy-5-methylcyclohexylmethyl-3,4-epoxy-5-methylcyclohexane carboxylate; (iii) cycloaliphatic diepoxides of bis(2,3-epoxycyclopentyl)ethers, bis(3,4-epoxycyclohexylmethyl)adipate, and 2-(3,4-epoxycyclohexyl-5,5-spiro-3,4-epoxy)cyclohexane-meta-dioxane; (iv) epoxides with six member ring structures such as diglycidyl esters of organic diacids including phthalic acid, partially hydrogenated phthalic acid, or fully hydrogenated phthalic acid, especially diglycidyl esters of hexahydrophthalic acids; (v) cresol-novolak epoxy resins; (vi) epoxy phenol novolak resins; (vii) polynuclear phenol-glycidyl ether-derived resins; (viii) aromatic and heterocyclic glycidyl amine resins such as tetraglycidylmethylene dianiline derived resins, triglycidyl-p-aminophenol derived resins, triazine based resins, and hydantoin epoxy resins; and (ix) hydroxyl substituted cycloaliphatic monoepoxides.

Reference may be made to the '199 patent for the details of these and other suitable cycloaliphatic epoxide resins. Some examples of especially useful commercially available materials suitable for use as Component (a) are CYRACURE® UVR6110, a cycloaliphatic epoxide resin having an epoxide equivalent weight of about 142, available from The Dow Chemical Company, Midland, Mich.; and CYRACURE™ 6105, a cycloaliphatic epoxy resin having an epoxide equivalent weight of 126-135, also available from The Dow Chemical Company, Midland, Mich. An example of a suitable resin for blending with such cycloaliphatic epoxide resins is PAPHEN™ PKHP-200, a phenoxy resin available from the InChem Corporation, Rock Hill, S.C., The Carbinol Functional Silicone Resin The carbinol functional silicone resin contains the units:

$(R^1_3SiO_{1/2})_a$ $(R^2_2SiO_{2/2})_b$ $(R^3SiO_{3/2})_c$ and $(SiO_{4/2})_d$.

In the formulae, $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms. $R^3$ is an alkyl group having 1-8 carbon atoms or an aryl group, a has a value of less than or equal to 0.6, b has a value of zero or greater than zero, c has a value of greater than zero, d has a value of less than 0.5, and the value of a+b+c+d=1. When each $R^2$ is methyl, the value of b is less than 0.3. There is on average at least one carbinol group per carbinol functional silicone resin molecule. Preferably, the $R^1+R^2+R^3$ groups in the carbinol functional silicone resin component (b) contain a high enough content of phenyl to provide the appropriate compatibility of component (b) with component (a). Preferably, greater than 10 percent by weight of the $R^1+R^2+R^3$ groups are phenyl groups, more preferably, greater than 25 percent by weight.

As used herein, the phrase carbinol group is considered as being any group containing at least one carbon-bonded hydroxyl (COH) group. The carbinol group may contain more than one COH group, such as for example:

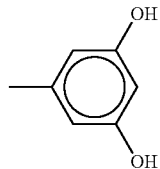

The alkyl groups in the carbinol functional silicone resin are illustrated by methyl, ethyl, propyl, butyl, pentyl, hexyl, and octyl, with the alkyl group typically being methyl. The aryl groups are illustrated by phenyl, naphthyl, benzyl, tolyl, xylyl, xenyl, methylphenyl, 2-phenylethyl, 2-phenyl-2-methylethyl, chlorophenyl, bromophenyl and fluorophenyl, with the aryl group typically being phenyl.

A carbinol group having at least 3 carbon atoms and being free of aryl groups is illustrated by the group $R^7OH$, where $R^7$ is a divalent hydrocarbon group having at least 3 carbon atoms, or a divalent hydrocarbonoxy group having at least 3 carbon atoms. $R^7$ is illustrated by alkylene groups such as $—(CH_2)_m—$ where m is 3-10, $—CH_2CH(CH_3)—$, $—CH_2CH(CH_3)CH_2—$, $—CH_2CH_2CH(CH_2CH_3)CH_2CH_2CH_2—$, and $—OCH(CH_3)(CH_2)_m—$, where m is 1-10. The carbinol group having at least 3 carbon atoms and being free of aryl groups is also illustrated by the group $R^8(OH)CH_2OH$, where $R^8$ is the group $—CH_2CH_2(CH_2)_mOCH_2CH—$ where m is 1-10.

An aryl containing carbinol group having at least 6 carbon atoms is illustrated by $R^9OH$, where $R^9$ is an arylene group such as $—(CH_2)_nC_6H_4—$, where n is 0-10, $—CH_2CH(CH_3)(CH_2)_nC_6H_4—$, where n is 0-10, and $—(CH_2)_nC_6H_4(CH_2)_n—$, where n is 1-10. The aryl-containing carbinol group typically has 6-14 atoms.

In the carbinol functional silicone resin component (b) according to the invention, a has a value of less than or equal to 0.6, preferably, 0.1-0.6, and more preferably 0.2-0.4; b has a value of zero or greater than zero, preferably 0-0.4; c has a value of greater than zero, preferably 0.3-0.8, and more preferably 0.4-0.8; and d has a value of less than 0.5, preferably 0-0.3. When each $R^2$ group is a methyl group, the value of b should be less than 0.3, preferably less than 0.1. Carbinol functional silicone resins according to the invention have on average at least one carbinol group per carbinol functional silicone resin molecule. Preferably, the equivalent weight of carbinol groups per carbinol functional silicone resin is 100-1,000, more preferably 200-800.

Some suitable carbinol functional silicone resins are represented by the following compositions:

I. A carbinol functional silicone resin containing the units:
$((CH_3)_3SiO_{1/2})_a$
$((R^2)CH_3SiO_{2/2})_b$ where $R^2$ is $—(CH_2)_3C_6H_4OH$
$((C_6H_5)CH_3SiO_{2/2})_b$ and
$(C_6H_5SiO_{3/2})_c$, II. A carbinol functional silicone resin containing the units: $((R^1)(CH_3)_2SiO_{1/2})_a$ where $R^1$ is —$(CH_2)_3C_6H_4OH$ and $(C_6H_5SiO_{3/2})_c$, III. A carbinol functional silicone resin containing the units: $((R^1)(CH_3)_2SiO_{1/2})_a$ where $R^1$ is —$(CH_2)_3OH$ and $(C_6H_5SiO_{3/2})_c$, IV. A carbinol functional silicone resin containing the units: $((R^1)(CH_3)_2SiO_{1/2})_a$ where $R^1$ is —$(CH_2)_3OH$ $(CH_3SiO_{3/2})_c$ and $(C_6H_5SiO_{3/2})_c$, V. A carbinol functional silicone resin containing the units: $((CH_3)_3SiO_{1/2})_a$ $((R^2)CH_3SiO_{2/2})_b$ where $R^2$ is —$(CH_2)_3OH$ $((C_6H_5)CH_3SiO_{2/2})_b$ and $(C_6H_5SiO_{3/2})_c$, VI. A carbinol functional silicone resin containing the units: $((CH_3)_3SiO_{1/2})_a$ $((R^1)(CH_3)_2SiO_{1/2})_a$ where $R^2$ is —$(CH_2)_3OH$ and $(C_6H_5SiO_{3/2})_c$, and VII. A carbinol functional silicone resin containing the units: $((R^1)(CH_3)_2SiO_{1/2})_a$ where $R^2$ is —$CH_2CH(CH_3)CH_2OH$ $((H)(CH_3)_2SiO_{1/2})_a$ and $(C_6H_5SiO_{3/2})_c$.

In formulae I-VII, a has a total value in the resin of 0.2-0.4, b has a total value in the resin of 0-0.4, and c has a total value in the resin of 0.3-0.8.

Carbinol functional silicone resins can be prepared by reacting:

(A) at least one hydrogen functional silicone resin containing units of the formulae:

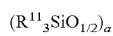

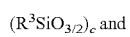

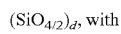, with (B) at least one vinyl terminated alcohol; in the presence of
(C) a hydrosilylation catalyst; and optionally
(D) at least one solvent.

In the formulae, $R^{11}$ and $R^{12}$ are each independently an alkyl group having 1-8 carbon atoms, an aryl group, or a hydrogen atom; $R^3$ is an alkyl group having 1-8 carbon atoms or an aryl group; a is less than or equal to 0.6; b is zero or greater than zero; c is greater than zero; d is less than 0.5; the sum of a+b+c+d=1; provided that when each $R^2$ is methyl, the value of b is less than 0.3, and provided there are at least two silicon-bonded hydrogen atoms present in the silicone resin.

The Anhydride Functional Silicone Resin

The anhydride functional silicone resin contains units of the formulae:

 (i)

 (ii)

 (iii)

 (iv)

In the formulae (i)-(iv), $R^4$, $R^5$, and $R^6$ can each independently represent an anhydride group, a hydrogen atom, an alkyl group having 1-8 carbon atoms, an aryl group, an aralkyl group, or an alkaryl group. The value of e is 0.1-0.6. The value of f is zero to 0.5. The value of g is 0.3-0.8. The value of h is zero to 0.3. Preferably, e is 0.2-0.4, f is zero to 0.2, g is 0.5-0.8, and h is zero. The sum of e, f, g, and h, is one. The composition of an average resin molecule contains more than two anhydride groups. Preferably, the equivalent weight of the anhydride groups per anhydride functional silicone resin is 100-1000 and more preferably 200-800

Representative of a suitable anhydride group, and the preferred anhydride group is the tetrahydrophthalic anhydride group shown below.

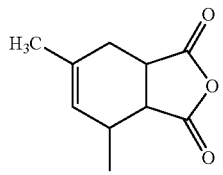

Suitable alkyl groups include methyl, ethyl, propyl, butyl, and octyl groups. A suitable aryl group is phenyl. The aralkyl group can include benzyl, phenylethyl, and 2-phenylpropyl. The alkaryl group can be tolyl or xylyl.

Anhydride functional silicone resins and methods of making the resins, as well as the resin used in Example 13, are described in the common assignee's copending U.S. Provisional Application Ser. No. 60/614,249, filed Sep. 29, 2004. Generally, anhydride functional silicone resins can be prepared by first preparing a SiH functional resin intermediate. This is followed by hydrosilation of the SiH functional resin intermediate with 2-methyl-3-butyn-2-ol ($HC\equiv CC(CH_3)_2OH$), dehydration to form a diene functionality, and Diels-Alder addition of maleic anhydride.

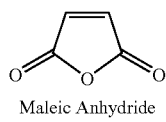

Maleic Anhydride

The reaction is carried out in a solvent such as benzene, toluene, xylene, tetrahydrofuran, diethylether, at a temperature of –50° C. to 100° C. The reaction is carried out typically in 30 minutes to 24 hours, generally in 6-12 hours. The ratio of the amount of maleic anhydride used to the amount of the SiH functional resin intermediate is from 1:0.1 to 1:2.5 on a molar basis, generally from 1:0.2 to 1:1.5.

Hydrosilation requires a catalyst to effect reaction between the —SiH containing reactant and the reactant containing unsaturation. Suitable catalysts are Group VIII transition metals. Some examples of metal catalysts that can be used are platinum catalysts resulting from reaction of chloroplatinic acid with organosilicon compounds containing terminal aliphatic unsaturation described in U.S. Pat. No. 3,419,593 (Dec. 31, 1968); Karstedt's catalyst described in his U.S. Pat. No. 3,715,334 (Feb. 6, 1973) and U.S. Pat. No. 3,814,730 (Jun. 4, 1974) which is a platinum-vinylsiloxane substantially free of chemically combined halogen; deposited platinum catalysts and complexed platinum catalysts described in U.S. Pat. No. 3,923,705 (Dec. 2, 1975); platinum-organopolysiloxane complexes prepared by reacting platinous halides with organopolysiloxanes having silicon bonded organic groups containing terminal olefinic unsaturation described in U.S. Pat. No. 5,175,325 (Dec. 29, 1992); and platinum supported on active carbon particles.

The Thermal or Photoactivated Acid Catalyst

Component (c), the thermal or photoactivated acid catalyst, is illustrated by photoinitiators that are capable of producing a cationic catalyst upon exposure to radiation in solution, including Bronsted Lowry or Lewis acid. Typically, these photoinitiators are exposed to ultraviolet (UV) radiation. Alternatively, the cationic catalyst can be added just prior to thermal cure in a two part system or it can be activated thermally. The photoinitiators that can be used as Component (c) are illustrated by onium salts, diaryliodonium salts of sulfonic acids, triarylsulfonium salts of sulfonic acids, diaryliodonium salts of boronic acids, and triarylsulfonium salts of boronic acids.

Representative onium salts are $R^{10}{}_2I^+MX_z^-$, $R^{10}{}_3S^+MX_z^-$, $R^{10}{}_3Se^+MX_z^-$, $R^{10}{}_4P^+MX_z^-$, and $R^{10}{}_4N+MX_z^-$, wherein each $R^{10}$ is an organic group having 1-30 carbon atoms such as aromatic carbocyclic groups having 6-20 carbon atoms. Each $R^{10}$ group can be substituted with 1-4 monovalent hydrocarbon groups such as alkoxy groups having 1-8 carbon atoms, alkyl groups having 1-16 carbon atoms, or nitro, chloro, bromo, cyano, carboxyl, mercapto, and aromatic heterocyclic groups, such as pyridyl, thiophenyl, and pyranyl groups.

M in the above formulae represents a metal or metalloid including transition metals such as Sb, Fe, Sn, Bi, Al, Ga, In, Ti, Zr, Sc, V, Cr, Mn, Cs, Co; rare earth metals such as lanthanides; Cd, Pr, and Nd; and metalloids such as B, P, and As. $MX_z^-$ represents a non-basic, non-nucleophilic anion such as $BF_4^-$, $B(C_6F_5)_4^-$, $PF_6^-$, $AsF_6^-$, $SbF_6^-$, $SbCl_6^-$, $HSO_4^-$, $ClO_4^-$, $FeCl_4^-$, $SnCl_6^-$, and $BiCl_5^-$.

Some suitable onium salts include bis-diaryl iodonium salts such as bis(dodecyl phenyl) iodonium hexafluoroarsenate available as UV 9380C from General Electric Company, Schenectady, New York, that is supplied as a dispersion of bis(dodecyl phenyl) iodonium hexafluoroarsenate in alcohol and an epoxy functional hydrocarbons; tolyl-cumyl iodonium tetrakis(pentafluorophenyl) borate available as Rhodorsil® 2074, that is supplied as 20 percent by weight solution in diacetone alcohol; bis(dodecylphenyl) iodonium hexafluoroantimonate; and dialkylphenyl iodonium hexafluoroantimonate. Other such salts are commercially available under the trademarks FC-508 or FX-512 for polyarylsulfonium hexafluorophosphates, and FC-509, of the 3M Company, UVE-1014 for polyarylsulfonium hexafluoroantimony salts available from the General Electric Company, and CYRACURE® UVI-6992 for hexafluorosulfonium phosphate salt photoinitiators from The Dow Chemical Company, Midland, Mich.

Diaryliodonium salts of sulfonic acids, triarylsulfonium salts of sulfonic acids, diaryliodonium salts of boronic acids, and triarylsulfonium salts of boronic acids, are also suitable as cationic photoinitiators.

Some suitable diaryliodonium salts of sulfonic acid are diaryliodonium salts of perfluoroalkylsulfonic acids, and diaryliodonium salts of aryl sulfonic acids. The diaryliodonium salts of perfluoroalkylsulfonic acids include diaryliodonium salts of perfluorobutanesulfonic acid, diaryliodonium salts of perfluoro-ethane sulfonic acid, diaryliodonium salts of perfluoro-octane sulfonic acid, and diaryliodonium salts of trifluoromethane sulfonic acid. The diaryliodonium salts of aryl sulfonic acids include diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid. The triarylsulfonium salts of sulfonic acid include triarylsulfonium salts of perfluoroalkylsulfonic acids, and triarylsulfonium salts of aryl sulfonic acids. The triarylsulfonium salts of perfluoroalkylsulfonic acids include triarylsulfonium salts of perfluorobutanesulfonic acid, triarylsulfonium salts of perfluoroethanesulfonic acid, triarylsulfonium salts of perfluoro-octane sulfonic acid, and triarylsulfonium salts of trifluoromethane sulfonic acid. The triarylsulfonium salts of aryl sulfonic acids include triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Some suitable diaryliodonium salts of boronic acids include diaryliodonium salts of perhaloarylboronic acids, and triarylsulfonium salts of boronic acids such as triarylsulfonium salts of perhaloarylboronic acid.

The amount of photoinitiator that is used is 0.01-10 parts by weight based on the parts by weight of component (b), preferably 0.1-5 parts by weight on the same basis.

The Organic Polyol

The organic polyols, optional component (d), are known compositions that are also described in detail in the '199 patent in Columns 13-19. Some representative organic polyols include polyether polyols such as polyhydroxyalkanes and polyoxyalkylene polyols; the acrylic and vinyl polyols; the polyester polyols; the polycaprolactone polyols; and other lactone polyols such as polyvalerolactone polyols, and polymethylcaprolactone polyols.

Suitable polyether polyols include (a) alkylene oxide adducts of polyhydroxyalkanes; (b) alkylene oxide adducts of non-reducing sugars and sugar derivatives; (c) alkylene oxide adducts of phosphorous and polyphosphorous acids; (d) alkylene oxide adducts of polyphenols; and (e) polyols from natural oils such as castor oil.

The class of organic polyols most preferred for use in coating compositions according to the invention are polycaprolactone polyols, representative of which are a number of commercially available products sold under the trademark TONE™ from The Dow Chemical Company, Midland, Mich. TONE™ 0305 Polyol was used in the examples. It is a low equivalent weight tri-functional liquid polyol for use in coating applications. Reference may be made to the '199 patent for the details of these and other suitable types of organic polyols. The organic polyol may be used in an amount of about 0-300 parts by weight, based on the parts by weight of component (b), preferably 1-300 parts by weight and more preferably 1-50 parts by eight on the same basis.

Coating compositions according to the invention are useful as radiation or thermal curable conformal coatings for application to electronic materials or devices such as printed circuit boards, optical devices such as optical fiber claddings, and optical system interlayers. The coating compositions can be prepared and used in such applications by combining and mixing the components of the composition together, applying the composition to at least one surface of a substrate, and curing or allowing the composition to cure. The compositions can be prepared by simply mixing the appropriate ingredients together. Standard state of the art mixing and application techniques and equipment can be used.

EXAMPLES

The following examples are set forth in order to illustrate the invention in more detail.

Examples 1-3

Preparation of Silicone Resin Intermediates A 1-A3

Phenyltrimethoxysilane and methyltrimethoxysilane were catalyzed by trifluoromethane sulfonic acid (TFMSA), hydrolyzed with deionized water, followed by distillative removal of by-product methanol. 1,1,3,3-tetramethyl-1,3-disiloxane (TMDS). Acetic acid was added, and the mixture was heated to 50° C. for three hours. Methanol and methyl acetate were removed via distillation. Heptane was added, and the mixture was washed with (i) saturated aqueous sodium bicarbonate and (ii) multiple aliquots of deionized water. The mixture was then filtered, and the solvent was removed as needed by distillation. The amounts of the ingredients used in this example are shown in Table 1. The resulting products are shown in Table 2.

Comparative Example 4

Preparation of Silicone Resin Intermediate A4

4958.4 gram of methyltrimethoxysilane was hydrolyzed with 252.3 gram of deionized water, in the presence of 4.93 gram of trifluoromethane sulfonic acid. 5456.4 gram of 1,1,3,3-tetramethyl-1,3-disiloxane (TMDS), and an additional amount of 725.8 gram of deionized water were added. The volatile components were removed via distillation, and then the product mixture was dissolved in 2210 gram of hexane. The product solution was washed with saturated aqueous sodium bicarbonate and multiple aliquots of deionized water, dried over magnesium sulfate, filtered and the solvent was removed. The composition of the silicone resin A4 was determined by NMR analysis to be $M^H_{0.54}D^{Me2}_{0.03}T^{Me}_{0.43}$ where $M^H$ is $H(CH_3)_2SiO_{1/2}$ $D^{Me2}$ is $(CH_3)_2SiO_{2/2}$ and $T^{Me}$ is $CH_3SiO_{3/2}$.

In Table 2, $M^H$ denotes $H(CH_3)_2SiO_{1/2}$, $T^{Me}$ denotes $CH_3SiO_{3/2}$, and $T^{Ph}$ denotes $C_6H_5SiO_{3/2}$.

Silicone resins A1-A4 above, were dissolved in xylene and heated to 70-95° C. A catalytic amount of 1 percent by weight of $Pt(Al_2O_3)$ was added, followed by the addition of allyl alcohol. The mixture was heated at 70-110° C. until the SiH was consumed, as determined by following the disappearance of its peak in the FTIR spectrum at about 2165 cm$^{-1}$. Triphenylphosphine and carbon black were added as needed. The product mixture was filtered, and the solvent was removed. The silicone resin type, reagent weight, yield, and the resin composition, are shown in Table 3. In Table 3, $M^{PrOH}$ denotes $(HO(CH_2)_3)(CH_3)_2SiO_{1/2}$, $T^{Ph}$ denotes $C_6H_5SiO_{3/2}$, $T^{Me}$ denotes $CH_3SiO_{3/2}$, and the allyl alcohol is $CH_2=CHCH_2OH$.

In the following Examples 5-9 and Comparative Example 10, the materials used in making the coating formulations included (i) CYRACURE® UVR6110, a cycloaliphatic epoxide resin having an epoxide equivalent weight of about 142, available from The Dow Chemical Company, Midland, Mich.; (ii) CYRACURE® UVI-6992, a hexafluorosulfonium phosphate salt photoinitiator, available from The Dow Chemical Company, Midland, Mich.; and (iii) TONE™ 0305 Polyol, a polycaprolactone triol available from The Dow Chemical Company, Midland, Mich.

TABLE 1

Reagent Weight in Grams

| Silicone Resin | PhSi(OMe)$_3$ | MeSi(OMe)$_3$ | TFMSA | TMDS | Heptane | Hexane | Water | Acetic Acid | Yield |
|---|---|---|---|---|---|---|---|---|---|
| A1 | 4752.0 | — | 2.1 | 1316.3 | 1299.8 | — | 501.0 | 588.6 | 4051.6 |
| A2 | 2379.5 | 1634.6 | 2.3 | 1316.4 | 1800.0 | — | 500.9 | 588.6 | 3385.0 |
| A3 | 3668.4 | — | 1.9 | 3668.7 | 1387.5 | — | 190.5 | 1640.1 | 4578.9 |
| A4 | — | 4958.4 | 4.9 | 5456.4 | — | 2210 | 252.3 | — | NA |

TABLE 2

Composition of Silicone Resin Intermediates

| Silicone Resin | Silicone Resin Intermediate |
|---|---|
| A1 | $M^H_{0.41}T^{Ph}_{0.59}$ |
| A2 | $M^H_{0.393}T^{Me}_{0.304}T^{Ph}_{0.303}$ |
| A3 | $M^H_{0.634}T^{Ph}_{0.366}$ |
| A4 | $M^H_{0.54}D^{Me2}_{0.03}T^{Me}_{0.43}$ |

Examples 5-9 & Comparative Example 10

Coating Formulations

To a 1 gram aluminum sample pan was added CYRACURE® UVR6110 cycloaliphatic epoxide resin, a carbinol functional silicone resin composition, and 4 weight percent of CYRACURE® UVI-6992 hexafluorosulfonium phosphate salt photoinitiator, in the amount shown in Table 4. The contents of the pan were mixed thoroughly with a wooden stirring rod, and the samples were stored away from light in a covered

TABLE 3

Carbinol Silicone Resin Composition, Type, and Amounts of Reagents in Grams

| Example | Carbinol Silicone Resin | Silicone Resin Type | Silicone Resin Amount | Allyl alcohol | Xylene | 1 Percent Pt/Al$_2$O$_3$ | Yield |
|---|---|---|---|---|---|---|---|
| 1 | $M^{PrOH}_{0.60}T^{Ph}_{0.378}$ | A3 | 253.1 | 305.6 | 250.1 | 0.8 | 343.4 |
| 2 | $M^{PrOH}_{0.355}T^{Me}_{0.314}T^{Ph}_{0.314}$ | A2 | 249.9 | 196.5 | 250.0 | 1.8 | 301.9 |
| 3 | $M^{PrOH}_{0.387}T^{Ph}_{0.583}$ | A1 | 250.0 | 166.0 | 251.0 | 2.1 | 297.0 |
| Comp. 4 | $M^{PrOH}_{0.502}D^{Me2}_{0.03}T^{Me}_{0.450}$ | A4 | 250.2 | 345.7 | 250.3 | 0.8 | 348.2 | box until exposed to an ultraviolet (UV) unit. The UV unit consisted of a conveyor belt set at 50 rpm, and a D unit and H unit UV lamp, that provided 500 mJ/cm$^2$ dose per pass. Each sample was exposed to the UV lamps, and evaluated for the completeness of the cure following each pass.

All of the samples were cured to rigid monoliths within 5 passes (2500 mJ/cm$^2$) under the UV lamps. The control samples exhibited indications of uneven cure, with certain regions of the sample being darker tan in color than other regions. Examples 5-9 exhibited very uniform cure with a very even tan tint that developed as curing progressed. Comparative Example 10 was the only material that was not transparent, and had poor surface quality, due to the limited compatibility of the non-phenyl containing silicone resin with the cycloaliphatic epoxide resin. Example 8 included a Carbinol Silicone Resin with a low phenyl content, and it exhibited transparency, but displayed surface roughness upon curing.

Since most coating applications need good compatibility between the carbinol functional silicone resin and the cycloaliphatic epoxide resin, phenyl containing carbinol functional silicone resins are preferred; although some applications may benefit from the surface activity of the lesser compatible low-phenyl containing carbinol functional silicone resins.

gram of toluene, 76.2 gram of tetramethyldisiloxane, and 0.36 gram of trifluoromethane sulfonic acid were added. The mixture was heated at 65° C. for three hours. The volatile components were removed via distillation, and 2.4 gram of calcium carbonate was added. The mixture was filtered, and additional solvent was removed via distillation. 1.38 gram of 1 percent by weight Pt/Al$_2$O$_3$ catalyst, and 197.8 gram of allyl alcohol were added, and the mixture was heated to reflux for 2.5 hours. 0.06 gram of triphenylphosphine, and 1 grain of DARCO® G60, were added. The mixture was filtered, and the solvent was removed via distillation under vacuum, yielding 293.2 gram of an opalescent colorless liquid. This Silicone Resin A5 was analyzed by Si$^{29}$ NMR and determined to have the composition $M^{ProH}_{0.38}T^{Ph}_{0.41}Q_{0.21}$.

0.8 gram of CYRACURE® UVR6110 cycloaliphatic epoxide resin, 0.4 gram of 10 percent by weight of CYRACURE® UVI 6976 triaryl sulfonium hexafluoroantimonate salt photoinitiator in CYRACURE® UVR6110 cycloaliphatic epoxide resin, and 0.8 gram of Silicone Resin A5, were added to an aluminum pan, and mixed extensively with a wooden stirring rod. The transparent mixture was exposed to a UV lamp processor as described in the previous example, for 3 passes (500 mJ/cm$^2$ dose) per pass. The result-

TABLE 4

Coating Formulations (grams) - Control Examples 1 & 2, and Examples 5-10

| Components | Control 1 | Control 2 | Example 5 | Example 6 | Example 7 | Example 8 | Example 9 | Comp. Ex. 10 |
|---|---|---|---|---|---|---|---|---|
| Cycloaliphatic Epoxide Resin | | | | | | | | |
| UVR 6110 | 3 | 3 | 2 | 2 | 2 | 2 | 1 | 2 |
| Carbinol Functional Silicone Resin | | | | | | | | |
| Example 1 | | | | | | | 2 | |
| Example 2 | | | | | | 2 | | |
| Example 3 | | | 1 | 2 | 3 | | | |
| Comp. Example 4 | | | | | | | | 2 |
| Organic Polyol | | | | | | | | |
| Tone ™ 0305 | | 1 | | | | | | |
| Photoactivated Acid Catalyst | | | | | | | | |
| UVI-6992 | 0.12 | 0.16 | 0.12 | 0.16 | 0.20 | 0.16 | 0.12 | 0.16 |
| Wt % Silicone Resin Solids | 0 | 0 | 33 | 50 | 60 | 50 | 67 | 50 |
| Appearance Following Cure | Rigid Transparent Uneven Color/Tan | Soft Transparent Uneven Color/Tan | Rigid Transparent Uniform Color/Tan | Rigid Transparent Uniform Color/Tan | Rigid Transparent Uniform Color/Tan | Rigid Transparent Surface Wrinkles | Rigid Transparent Uniform Color/Tan | Rigid Hazy, Uneven Cure |

In the following Example 11, the materials used included (i) CYRACURE® UVI 6976, a triaryl sulfonium hexafluoroantimonate salt photoinitiator, available from The Dow Chemical Company, Midland, Mich.; (ii) ORGANOSILICASOL™ IPA-ST, a 10-5 nm colloidal silica dispersion containing 30 percent by weight of solids in isopropyl alcohol, available from Nissan Chemical America Corporation, Houston, Tex.; and (iii) DARCO® G-60, an activated carbon available from American Norit Co., Marshall, Tex.

Example 11

Preparation of Silicone Resin A5 and Coatings Therefrom

A mixture of 225.0 gram of phenyltrimethoxysilane, and 111.5 gram of ORGANOSILICASOL™ IPA-ST, was hydrolyzed with 42.9 gram of water and 0.12 gram of concentrated HCl. After heating the mixture to reflux for 15 minutes, 256.8 ing film was transparent, exhibited an even tan color, suggesting that a uniform cure and dispersion of the photocatalyst had been obtained. The cured film had good scratch resistance.

In the following Example 12, the materials used included (i) FC 520 Catalyst, a trifluoromethane sulfonic acid catalyst available from the 3M Company, Minneapolis, Minnesota; (ii) CYRACURE™ ERL4221D, a cycloaliphatic epoxide resin having an epoxide equivalent weight of 130, available from The Dow Chemical Company, Midland, Mich.; and (iii) propylene glycol monoethyl ether acetate (PGMEA), available from Mallinckrodt Baker, Phillipsburg, N.J.

Example 12

Thermal Curing

To a 2 ounce glass sample vial was added 5 gram of the carbinol functional silicone resin used in Example 1, 3.25 gram of CYRACURE™ ERL4221D cycloaliphatic epoxide resin, and 0.32 gram of a 10 weight percent solution of FC 520 Catalyst in PGMEA solvent. The materials were mixed thoroughly with a wooden stirring rod, and the material was cast onto a polytetrafluoroethylene (PTFE) treated 8 inch silicon wafer, and thermal cured for one hour at 100° C., and one hour at 150° C. in a laboratory oven. A rigid, transparent coating that adhered strongly to the PTFE treated silicon wafer resulted.

Example 13

Anhydride Functional Silicone Resin and UV Cured Composition 8.04 gram (1.0 equivalent) of CYRACURE™ 6105, a cycloaliphatic epoxy resin having an epoxide equivalent weight of 126-135, available from The Dow Chemical Company, Midland, Mich., was mixed with 1.96 gram (0.1 equivalent) of an anhydride functional silicone resin in a glass vial. The anhydride functional silicone resin used in this example was a liquid product having a $^{29}$Si NMR spectrum containing major peaks centered at chemical shifts (relative to 0 ppm for tetramethylsilane) of 7 ppm (0.21 mol fraction, $M^R$), −20 ppm (0.29 mol fraction $(CH_3)_2SiO_{2/2}$), and −66 ppm (0.40 mol fraction, $CH_3SiO_{3/2}$). The $M^R$ unit was tetrahydrophthalic anhydride that is shown below in more detail.

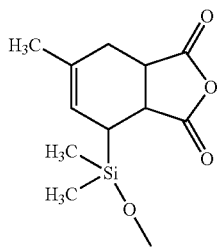

The mixture was stirred with a stainless steel spatula, and yielded a clear, slightly yellow mixture having a viscosity of 350 centipoise (cP)/mPa·s at 25° C. The mixture was heated at 85° C. for three hours in a sealed vial. The resulting mixture was a clear, yellow colored liquid with a viscosity of 629 centipoise (cP)/mPa·s at 25° C. To 1.39 gram of the yellow colored liquid was added 1.15 gram of PAPHEN™ PKEP-200, a phenoxy resin available from the InChem Corporation, Rock Hill, S.C., and 0.05 grams of photocatalyst FX-512 triaryl sulfonium hexafluoroantimonate salt, available from the 3M Company, Minneapolis, Minn.

The resulting mixture was homogenized in a Hauschild dental mixer for 30 seconds, hand stirred with a stainless steel spatula, and homogenizing an additional 30 seconds in the dental mixer. The product was a translucent pale yellow gum with a viscosity estimated to be greater that 100,000 centipoise (cP)/mPa·s. The gum was stencil printed onto a glass slide at a thickness of 50 microns. The stencil print was covered with a second glass slide, and the article was cured using a mercury Vapor Lamp operated at 300 watts and a 30 percent belt power. The total power measured was 3,175 milli-Joules per square centimeter. The cured article could not be separated without breaking the glass slides.

Compositions according to the invention can be used in preparing one-part ultraviolet (UV) cured coatings or encapsulants, as an adhesive, a photodefinable coating, or as a thermal cured coating. The cycloaliphatic epoxy resin adds toughness and adhesion, while the carbinol functional silicone resin or anhydride functional silicone resin add water resistance, weatherability, thermal stability, and flexibility, to the coatings and adhesives.

Other variations may be made in compounds, compositions, and methods described herein without departing from the essential features of the invention. The embodiments of the invention specifically illustrated herein are exemplary only, and not intended as limitations on their scope except as defined in the appended claims.

The invention claimed is:

1. A radiation or thermal curable composition comprising:
   (a) 20-300 parts by weight of a cycloaliphatic epoxide resin;
   (b) 100 parts by weight of a carbinol functional silicone resin containing the units:
   $(R^1{}_3SiO_{1/2})_a$
   $(R^2{}_2SiO_{2/2})_b$
   $(R^3SiO_{3/2})_c$ and
   $(SiO_{4/2})_d$,
   wherein $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms; $R^3$ is an alkyl group having 1-8 carbon atoms or an aryl group; a has a value of less than or equal to 0.6; b has a value of zero or greater than zero; c has a value of greater than zero; d has a value of less than 0.5; the value of a+b+c+d=1; provided that when each $R^2$ is methyl, the value of b is less than 0.3; there being on average at least one carbinol group per carbinol functional silicone resin molecule; and greater than 10 percent by weight of the $R^1+R^2+R^3$ groups are phenyl groups
   or a mixture thereof with an anhydride functional silicone resin, provided there may not be more than 50 parts by weight of the anhydride functional silicone resin; and
   (c) 0.01-10 parts by weight of a thermal or photoactivated acid catalyst.

2. A composition according to claim 1 in which the carbinol functional silicone resin (b) contains units selected from the group consisting of:
   I. the units:
   $((CH_3)_3SiO_{1/2})_a$
   $((R^2)CH_3SiO_{2/2})_b$ where $R^2$ is —$(CH_2)_3C_6H_4OH$
   $((C_6H_5)CH_3SiO_{2/2})_b$ and
   $(C_6H_5SiO_{3/2})_c$,
   II. the units:
   $((R^1)(CH_3)_2SiO_{1/2})_a$ where $R^1$ is —$(CH_2)_3C_6H_4OH$ and
   $(C_6H_5SiO_{3/2})_c$,
   III. the units:
   $((R^1)(CH_3)_2SiO_{1/2})_a$ where $R^1$ is —$(CH_2)_3OH$ and
   $(C_6H_5SiO_{3/2})_c$,
   IV. the units:
   $((R^1)(CH_3)_2SiO_{1/2})_a$ where $R^1$ is —$(CH_2)_3OH$
   $(CH_3SiO_{3/2})_c$ and
   $(C_6H_5SiO_{3/2})_c$,
   V. the units:
   $((CH_3)_3SiO_{1/2})_a$
   $((R^2)CH_3SiO_{2/2})_b$ where $R^2$ is —$(CH_2)_3OH$
   $((C_6H_5)CH_3SiO_{2/2})_b$ and
   $(C_6H_5SiO_{3/2})_c$,
   VI. the units:
   $((CH_3)_3SiO_{1/2})_a$
   $((R^1)(CH_3)_2SiO_{1/2})_a$ where $R^2$ is —$(CH_2)_3OH$ and
   $(C_6H_5SiO_{3/2})_c$, and VII. the units:
$((R^1)(CH_3)_2SiO_{1/2})_a$ where $R^2$ is —$CH_2CH(CH_3)CH_2OH$
$((H)(CH_3)_2SiO_{1/2})_a$ and
$(C_6H_5SiO_{3/2})_c$, where a has a total value in the resin of 0.2-0.4; b has a total value in the resin of zero to 0.4; and c has a total value in the resin of 0.3-0.8.

3. A composition according to claim 2 further comprising (d) 1-300 parts by weight of an organic polyol selected from the group consisting of polyhydroxyalkanes, polyoxyalkylene polyols, acrylic polyols, vinyl polyols, polyester polyols, and polycaprolactone polyols.

4. A composition according to claim 1 wherein the anhydride functional silicone resin comprises only $(R^4_3SiO_{1/2})_e$ and $(R^6SiO_{3/2})_g$ units, and where $R^4$, and $R^6$ are each independently an anhydride group, a hydrogen atom, an alkyl group having 1-8 carbon atoms, an aryl group, an aralkyl group, or an alkaryl group; e has a value of 0.1-0.6; and g has a value of 0.3-0.8; with the proviso that the anhydride functional silicone resin contains on average more than two anhydride groups per average molecule.

5. A composition according to claim 1 wherein the anhydride group is tetrahydrophthalic anhydride.

6. A composition according to claim 1 in which the cycloaliphatic epoxide resin (a) has an average of two or more epoxy groups per molecule, and is selected from the group consisting of (i) diepoxides of cycloaliphatic esters of dicarboxylic acids;
   (ii) 3,4-epoxycyclohexylmethyl-3,4-epoxycyclohexane carboxylates; (iii) cycloaliphatic diepoxides of bis(2,3-epoxycyclopentyl) ethers, cycloaliphatic diepoxides of bis(3,4-epoxycyclohexylmethyl) adipate, or -cycloaliphatic diepoxides of 2-(3,4-epoxycyclohexyl-5,5-spiro-3,4-epoxy)cyclohexane-meta-dioxane; (iv) epoxides with a six member ring structure; (v) cresol-novolak epoxy resins; (vi) epoxy phenol novolak resins; (vii) polynuclear phenol-glycidyl ether-derived resins; and (viii) aromatic derived glycidyl amine resins or heterocyclic derived glycidyl amine resins.

7. A composition according to claim 1 in which (c) is selected from the group consisting of onium salts, diaryliodonium salts of sulfonic acids, triarylsulfonium salts of sulfonic acids, diaryliodonium salts of boronic acids, triarylsulfonium salts of boronic acids, a Bronsted Lowery acid and a Lewis acid.

8. A composition according to claim 1 in which the thermal catalyst contains cobalt.

9. A composition according to claim 1 further comprising (d) 1-300 parts by weight of an organic polyol selected from the group consisting of polyhydroxyalkanes, polyoxyalkylene polyols, acrylic polyols, vinyl polyols, polyester polyols, and polycaprolactone polyols.

10. A method of coating a substrate comprising applying to at least one surface of the substrate the composition according to claim 9, and curing the composition.

11. A method of coating a substrate comprising applying to at least one surface of the substrate the composition according to claim 1, and curing the composition.

12. A composition according to claim 1 in which the catalyst (c) is a photoactivated acid catalyst.

13. A radiation or thermal curable composition comprising:
   (a) 20-300 parts by weight of a cycloaliphatic epoxide resin;
   (b) 100 parts by weight of a carbinol functional silicone resin; and
   (c) 0.01-10 parts by weight of a thermal or photoactivated acid catalyst; the carbinol functional silicone resin containing the units:
   $(R^1_3SiO_{1/2})_a$
   $(R^2_2SiO_{2/2})_b$
   $(R^3SiO_{3/2})_c$ and
   $(SiO_{4/2})_d$,
   wherein $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms; $R^3$ is an alkyl group having 1-8 carbon atoms or an aryl group; a has a value of less than or equal to 0.6; b has a value of zero or greater than zero; c has a value of greater than zero; d has a value of less than 0.5; the value of a+b+c+d=1; provided that when each $R^2$ is methyl, the value of b is less than 0.3; there being on average at least one carbinol group per carbinol functional silicone resin molecule; and greater than 10 percent by weight of the $R^1+R^2+R^3$ groups are phenyl groups.

14. A composition according to claim 13 further comprising (d) 1-300 parts by weight of an organic polyol selected from the group consisting of polyhydroxyalkanes, polyoxyalkylene polyols, acrylic polyols, vinyl polyols, polyester polyols, and polycaprolactone polyols.

15. A method of coating a substrate comprising applying to at least one surface of the substrate the composition according to claim 13, and curing the composition.

16. A radiation or thermal curable composition comprising:
   (a) 20-300 parts by weight of a cycloaliphatic epoxide resin;
   (b) 100 parts by weight of a carbinol functional silicone resin having a carbinol equivalent weight of 200-1000; and
   (c) 0.01-10 parts by weight of a thermal or photoactivated acid catalyst; the carbinol functional silicone resin containing the units:
   $(R^1_3SiO_{1/2})_a$
   $(R^2_2SiO_{2/2})_b$
   $(R^3SiO_{3/2})_c$ and
   $(SiO_{4/2})_d$,
   wherein $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms; $R^3$ is an alkyl group having 1-8 carbon atoms or an aryl group; a has a value of less than or equal to 0.6; b has a value of zero or greater than zero; c has a value of greater than zero; d has a value of less than 0.5; the value of a+b+c+d=1; provided that when each $R^2$ is methyl, the value of b is less than 0.3; there being on average at least one carbinol group per carbinol functional silicone resin molecule; and greater than 10 percent by weight of the $R^1+R^2+R^3$ groups are phenyl groups.

17. A composition according to claim 16 further comprising (d) 1-300 parts by weight of an organic polyol selected from the group consisting of polyhydroxyalkanes, polyoxyalkylene polyols, acrylic polyols, vinyl polyols, polyester polyols, and polycaprolactone polyols.

18. A method of coating a substrate comprising applying to at least one surface of the substrate the composition according to claim 16, and curing the composition.

* * * * *